UNITED STATES PATENT OFFICE.

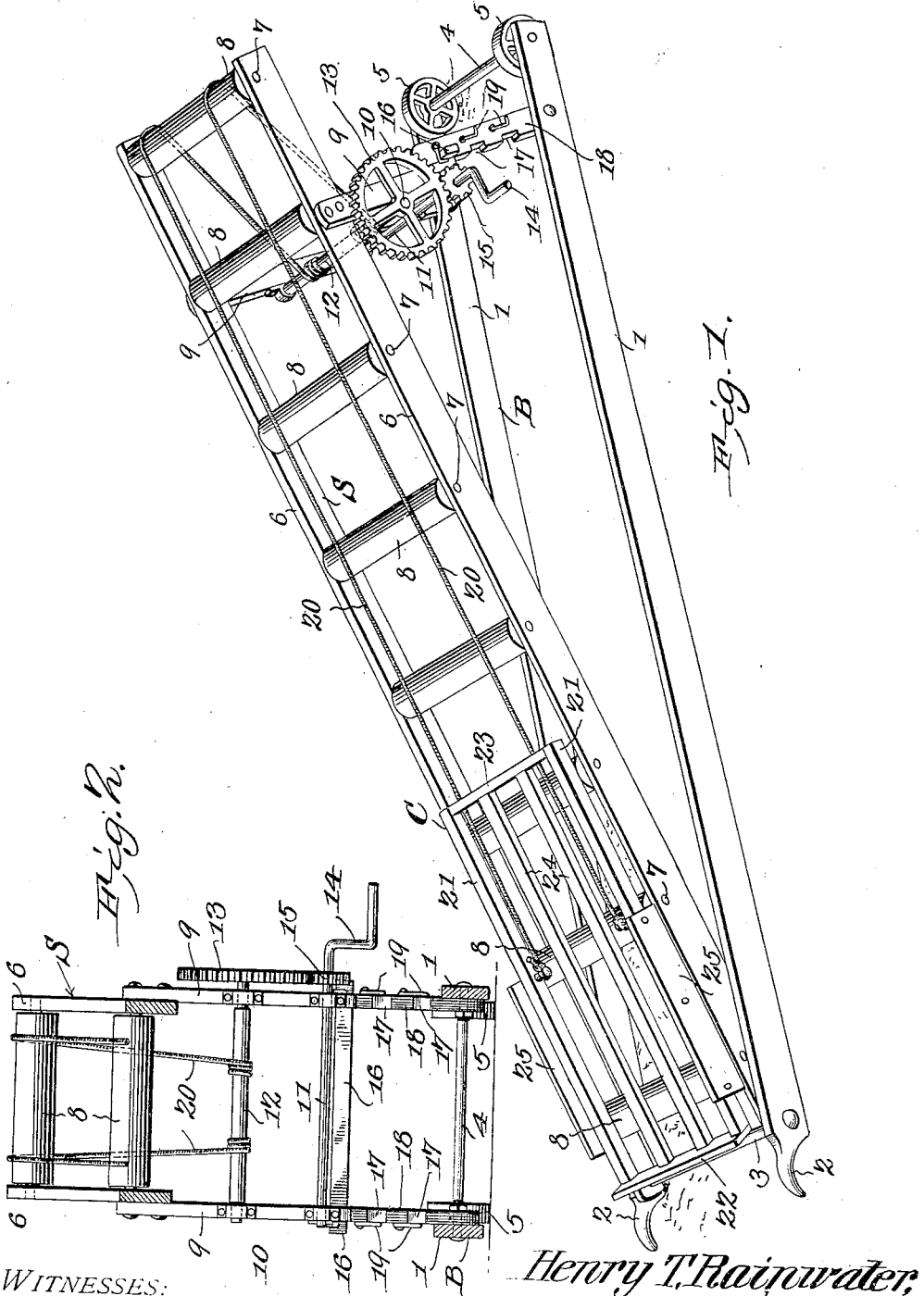

HENRY T. RAINWATER, OF CLINTON, ARKANSAS.

LOADING APPARATUS.

No. 813,448.  Specification of Letters Patent.  Patented Feb. 27, 1906.

Application filed December 23, 1905. Serial No. 293,108.

*To all whom it may concern:*

Be it known that I, HENRY T. RAINWATER, a citizen of the United States, residing at Clinton, in the county of Van Buren and State of Arkansas, have invented a new and useful Loading Apparatus, of which the following is a specification.

This invention relates to lifting and loading apparatus for handling and elevating heavy articles—such as bales of cotton and other material, barrels, boxes, casks, and the like; and it has among its objects to present a device of this class which may be easily manipulated and which will enable one man without other assistance to handle and elevate heavy articles, as above enumerated, and to load such articles upon trucks and the like.

Other objects of the invention are to simplify and improve the construction and operation of this class of devices.

With these and other ends in view, which will readily appear as the nature of the invention is better understood, the same consists in the improved construction and novel arrangement and combination of parts, which will be hereinafter fully described, and particularly pointed out in the claims.

In the accompanying drawings has been illustrated a simple and preferred form of the invention, it being, however, understood that no limitation is necessarily made to the precise structural details therein exhibited, but that changes, alterations, and modifications within the scope of the invention may be resorted to when desired.

In the drawings, Figure 1 is a perspective view of a loading apparatus constructed in accordance with the principles of the invention and showing the apparatus in position for use. Fig. 2 is a transverse vertical sectional view.

Corresponding parts in both the figures are indicated throughout by similar characters of reference.

The base-frame B of the improved loading apparatus includes a pair of side members or sills 1 1, the front ends of which are provided with handles 2 2 and are spaced apart, as by a rung or cross-piece 3. The rear ends of the sills or side members have bearings for an axle 4, provided with a pair of low truck-wheels 5 5.

S designates the skid-frame or lifting-frame, which includes a pair of side members 6 6, the front ends of which are pivoted upon the rung 3. The side members 6 6 are connected by a plurality of shafts 7 7, upon which are journaled the rollers 8 8, which latter extend above the upper edges of the side members 6.

Secured upon the side pieces 6 6, near their rear ends, are a pair of downwardly-extending arms or brackets 9 9, having bearings for a pair of shafts 10 and 11, the former of which carries a drum 12 and a spur-wheel 13. The shaft 11 is provided with an operating-crank 14 and with a pinion 15, meshing with the spur-wheel 13, thus providing means for readily rotating the drum-carrying shaft. The arms or brackets 9 9 are also connected by a cross-piece 16, adapted to engage notches 17 in a pair of arms 18, which are pivoted upon the side members or sills of the base-frame, said arms being provided with hooks 19, adapted to engage the ends of the cross-piece 16 for the purpose of retaining the parts securely in any of the various positions to which they may be adjusted. It will be readily seen that by providing each of the arms 18 with a plurality of notches 17 the rear end of the skid-frame may be sustained at various elevations.

Connected with and wound upon the drum 12 are a pair of ropes or flexible hoisting elements 20, which are guided over the rearmost roller 8, which in practice is also the uppermost one, and to a carriage C, with which the ends of said ropes are connected. Said carriage consists mainly of a rectangular frame having side members 21, front and rear end members 22 23, and bottom bars 24. Said carriage is also provided at the sides thereof with flange-bars 25, the upper edges of which extend above the upper edges of the side members 21 and the lower edges of which extend below said side members so as to nearly touch the upper edges of the side members 6. These flange-bars will engage the ends of the rollers 8 and will thus prevent lateral displacement of the carriage.

The operation and advantages of this invention will be readily understood from the foregoing description, taken in connection with the drawings hereto annexed. The device may be moved from one place to another and be placed in the position where it is to be used with the facility of an ordinary truck by simply taking hold of the handles 2, lifting the front end of the base-frame, and rolling the latter upon the truck-wheels 5. When the skid-frame has been adjusted and secured at the desired elevation, the article to be elevated or loaded is tilted upon the carriage, the latter being in the position shown in Fig. 1 of the drawings—that is to say, at the lower or front end of the skid-frame. The crank-handle 14 is then operated to rotate the drum-carrying shaft, thus winding the ropes upon the drum and causing the carriage to travel upwardly upon the skid-frame until the upper end of the latter has been reached, which obviously is placed in alinement with or extended slightly over the bed of the truck or platform upon which the article is to be loaded, and thus enabling the article to be readily tilted from the carriage onto such truck or platform.

The ropes or hoisting elements 20 are preferably connected with the side members 21 of the carriage about midway of their lengths, so that a portion of the carriage may be projected beyond the upper or rear extremity of the skid-frame, thus facilitating the discharge of the article supported upon the carriage.

Having thus described the invention, what is claimed is—

1. In a loading apparatus, a base-frame having side members provided with handles at their front ends, supporting-wheels at the rear end of the frame, and a skid-frame pivoted between the front ends of the side members of the base-frame.

2. A base-frame having carrying-wheels at its rear end and handles at its front end, a skid-frame pivoted between the front ends of the side members of the base-frame, depending brackets secured upon the side members of the skid-frame, a cross-piece connecting said brackets, and notched arms pivoted upon the side members of the base-frame.

3. A base-frame, a skid-frame pivoted between the front ends of the side members of the base-frame, rollers journaled between the side members of the skid-frame, brackets depending upon the sides of the latter, a drum-carrying shaft journaled upon said brackets, a cross-bar connecting the brackets, notched arms pivoted upon the side members of the base-frame, flexible hoisting elements connected with the drum and guided over the rollers of the skid-frame, a carriage connected with the hoisting elements, and means for operating the drum-carrying shaft.

4. A base-frame, a skid-frame pivoted between the front ends of the side members of the base-frame, means for adjustably spacing and connecting the rear ends of the two frames, rollers journaled between the side members of the skid-frame, a carriage movable over said rollers, and means for operating the carriage.

5. A base-frame, a skid-frame pivoted between the front ends of the side members of the base-frame, and means for adjustably spacing and connecting the rear ends of the two frames.

6. In a loading apparatus, a skid-frame having side members, rollers journaled between the side members and projecting above the upper edges of the latter, a carriage-frame movable over the rollers, and flanges upon said carriage-frame engaging the ends of the rollers.

In testimony that I claim the foregoing as my own I have hereto affixed my signature in the presence of two witnesses.

HENRY T. RAINWATER.

Witnesses:
S. I. BAIRD,
H. P. LAY.